Figure 1:
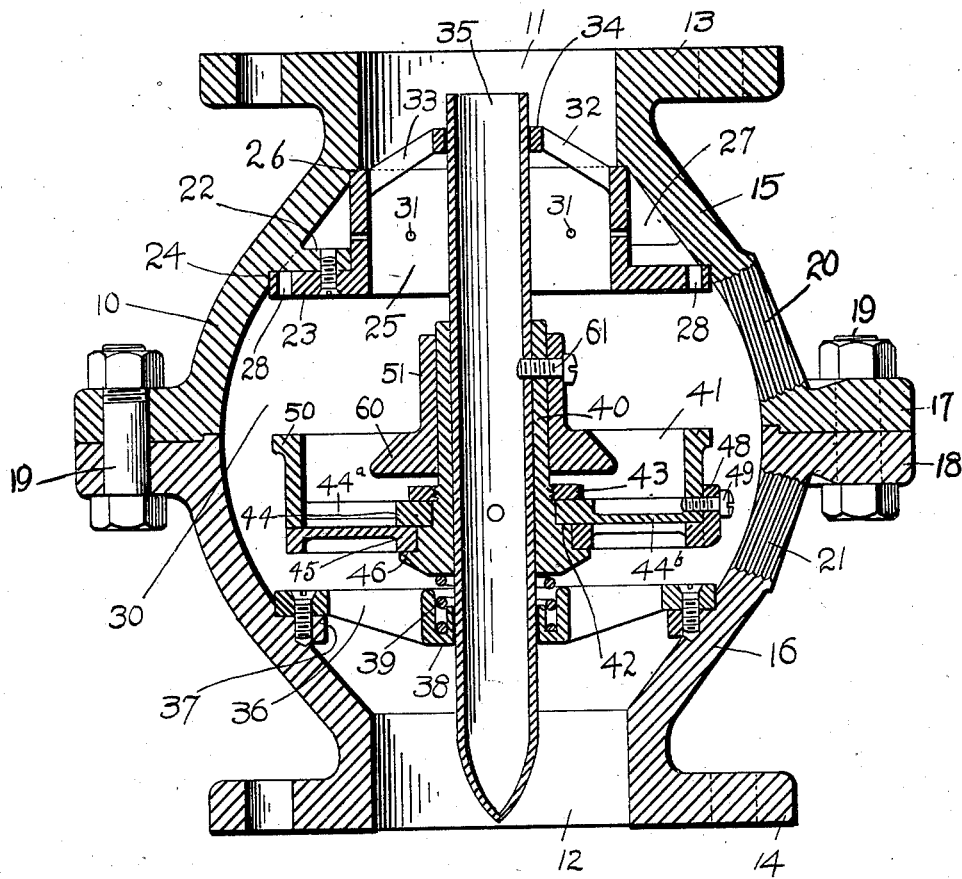

No. 679,717. Patented Aug. 6, 1901.
G. I. ALDEN.
AUTOMATIC HYDRAULIC GRAVITY VALVE.
(Application filed Jan. 28, 1901.)

(No Model.) 2 Sheets—Sheet 1.

Witnesses:
Inventor
George I. Alden,
By Alden C. Higgins,
Attorney.

No. 679,717. Patented Aug. 6, 1901.
G. I. ALDEN.
AUTOMATIC HYDRAULIC GRAVITY VALVE.
(Application filed Jan. 28, 1901.)
(No Model.) 2 Sheets—Sheet 2.
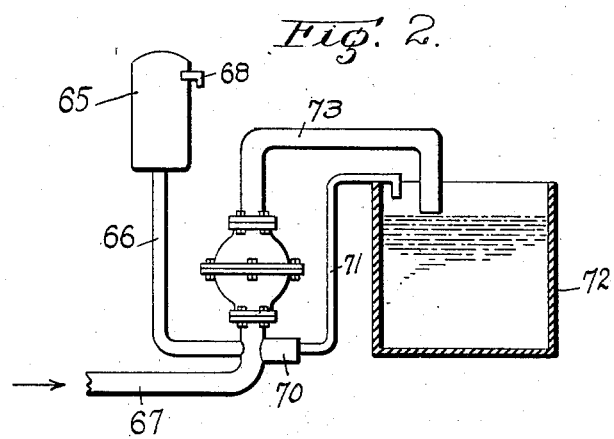
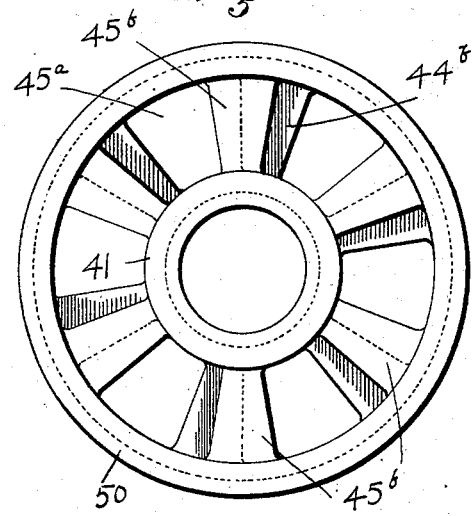
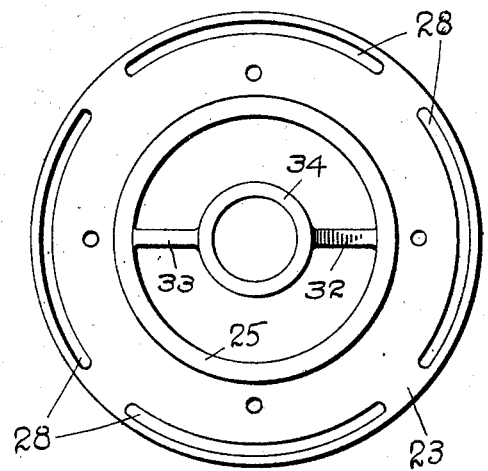
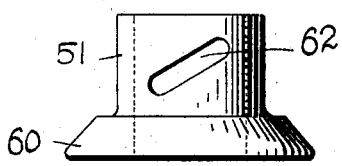
Witnesses
Inventor.
George I. Alden.
By Aldus C. Higgins,
Attorney.
THE NORRIS PETERS CO., PHOTO-LITHO., WASHINGTON, D. C.

UNITED STATES PATENT OFFICE.

GEORGE I. ALDEN, OF WORCESTER, MASSACHUSETTS.

AUTOMATIC HYDRAULIC GRAVITY-VALVE.

SPECIFICATION forming part of Letters Patent No. 679,717, dated August 6, 1901.

Application filed January 28, 1901. Serial No. 45,007. (No model.)

*To all whom it may concern:*

Be it known that I, GEORGE I. ALDEN, a citizen of the United States of America, and a resident of the city of Worcester, county of Worcester, State of Massachusetts, have invented certain new and useful Improvements in Automatic Hydraulic Gravity-Valves, of which the following is a specification.

My invention relates to valves adapted to check the flow of fluid through a pipe when the velocity of the flow exceeds a certain rate.

More particularly my invention has to do with a self-closing valve to be used in connection with hydraulic elevator mechanism, so that the flow of water through pipes in the operation of raising and lowering the car may be checked in case the car attains more than a predetermined rate of speed.

In the ordinary form of self-closing valve as soon as the flow of water is checked by the operation of the valve the valve opens again, permitting the full flow. This opening takes place almost immediately after the valve has closed. The flow through the valve being checked, the valve opens at once. The momentum of the column of water in the pipes of the elevator mechanism and car, which on the infrequent occasion of the operation of this valve is generally heavily loaded, is hardly overcome during the very short time the valve remains upon its seat, so that the operation of opening and closing the valve is sudden, taking place within very narrow limits of speed of flow, the momentum finally being reduced by successive openings and closings of the valve, which causes a very jerky and unpleasant effect on the movement of the car.

One feature of my invention consists in means for holding the valve to its seat until the flow of water has been reduced from the increased flow at which the valve operates to the predetermined limit at which the valve remains open and until the momentum of the moving parts is overcome.

Another feature of my invention consists in providing adjustable surfaces for the water to act upon to seat said valve, whereby the valve may be regulated to close at any predetermined speed of the elevator mechanism.

Another feature of my invention consists of adjustable means for regulating the opening through the valve when the valve is seated or closed. By this means the speed of the flow, and consequently the car, can be reduced from its increased flow to a predetermined limit.

A further feature of my invention consists in means for reducing or taking up the shock resulting from checking suddenly a moving column of water and elevator mechanism from increased speed down to a predetermined limit without unpleasant shock or jerk in the car.

Referring to the drawings accompanying this specification, Figure 1 represents a longitudinal sectional view of my float-valve. Fig. 2 is a diagrammatic view of said valve applied to the elevator-exhaust and the overflow-tank, showing the connecting shock-reducing devices. Fig. 3 is a detail view of the adjustable wing-plates. Fig. 4 is a detail view of the valve-seat. Fig. 5 is a detail view of the adjustable collar regulating the flow of the water through the valve when it is closed.

The casing 10 is made in substantially spherical form. It is provided at each end with the main orifice 11 12, around which are the flanges 13 14, respectively, adapted to be bolted to similar flanges in the fittings of the pipe-line. The casing 10 is transversely divided into two sections 15 16 by having the flanges 17 18, respectively, which are held together by bolts 19. Said sections are provided with the screw-threaded openings 20 21, through which the valve may be adjusted, said openings adapted to be closed by screwplugs. (Not shown.) Section 15 of the casing is provided with the interior extensions 22, to which is permanently fastened the annular flange or valve-seat 23 of the hollow cylinder 25. Said flange fits the casing tightly at 24. Said cylinder is extended to the casing and fitted tightly thereto at 26 and forms an inward extension of the orifice 11. Thus between the casing 15 and the outside of the angular annular ring formed by the flange 23 and hollow cylinder 25 is provided an annular chamber 27, hereinafter referred to as a "vacuum-chamber." Said valve-seat is provided with the circular openings 28, which are adapted to be covered by the valve when seated and which communicate from valve-chamber 30 to the annular chamber 27. The holes 31 through the ring 25 communicate from said annular chamber to the discharge-orifice 11. The flow of water through the cylinder 25 and by the holes 31 creates a vacuum in said chamber when the valve is seated. Said cylinder 25 is provided with the inwardly-extended arms 32 and 33, connecting with the ring 34, which serves as a guide for the circular hollow valve-stem 35. Said valve-stem is guided at the other end of the valve-chamber by the circular plate 36, having ample openings for free passage of the water and being fastened to the flange 37 of the casing 16. It is provided with a spiral-spring seat 38 around the central guide-openings holding the spiral spring 39 to cushion the valve as it falls back into its open position.

The main valve-sleeve 40 is mounted fast to the valve-stem 35 and supports the main cup-shaped valve 41, fitted to said valve-sleeve and held between the annular shoulder 42 and the screw-collar 43. The flat circular portion 44 of the main valve forms one wing-plate thereof and is provided with the openings 44$^a$ between the wings 44$^b$. Said openings are adapted to be covered, more or less, by the wings 45$^b$ of the adjustable circular plate 45, mounted on the valve-sleeve between the main valve and the shoulder 46. Said plate 45 is provided with openings 45$^a$, similar to the openings in the valve 41, and may be revolubly adjusted over said openings around the valve-sleeve to regulate the opening through the wing-plates, and thus the surface against which the water acts in lifting said valve. This plate 45 is fixed in its adjusted position by means of a screw 49, fastened through the extension 48 and into the valve 41. The seating-surface 50 on said valve is adapted to cover the circular openings 28 in the valve-seat 23. Adjustably mounted on the valve-sleeve 40 is the ring 51, having the flange 60. This ring 51 may be adjusted longitudinally on the sleeve 40 to regulate the size of the passage between the flange 60 and the cylinder 25 when the valve is closed. The sleeve is held in its adjusted position by the screw 61, passing through the slanting slot 62 and into the main valve-sleeve 40.

In order to prevent shock to the elevator, which might result from a sudden checking of the flow of the water, an air-chamber 65 is connected by means of pipe 66 to the discharge-pipe 67 of the elevator, through which water comes to the float-valve. The air-chamber is provided with any well-known air-check valve 68, allowing admission of air into the air-chamber, but preventing its escape. Thus it will be seen that an air-cushion is provided to prevent the shock which might otherwise result from the sudden checking of the column of water in the pipes, and consequently the elevator mechanism. A relief-valve 70 is also provided on the pipe 67, which may be of any ordinary and well-known type of pressure-relief valve. This relief-valve is set to open at a certain pressure, allowing escape of water from pipe 67 in case the pressure for any reason becomes excessive. The relief-valve is connected by waste-pipe 71 with the overflow-tank 72, in which the discharge-pipe 73 from the self-closing valve also opens. If the capacity of the air-chamber is not sufficient to provide for any unusual shock, or if for any other reason said air-chamber fails to operate to prevent the shock, the relief-valve opens.

The operation of the device is as follows: As the water flows through the valve-chamber it finds a ready passage through openings in the movable portion of the valve and around the same. The openings in the wing-plates are so adjusted that the surface presented to resist the flow of the water is sufficient to raise the valve if the speed of flow increases beyond a certain predetermined rate for which the openings are adjusted. When such a velocity is attained, the valve is raised, seating itself on the valve-seat 23. Water flowing through the valve when the valve is seated flows through the openings in the wing-plates and is limited in amount to that which may flow between the flange 60 and the cylinder 25. This is regulated by adjusting the collar 51 on the valve-sleeve. To hold the valve in its closed position until the elevator is sufficiently slowed down, the reduced flow well established, and the momentum of moving parts overcome, the valve is held in its closed position by means of the vacuum-chamber 27. The flow of the water through the pipe 25 past the orifices 31 creates a vacuum in chamber 27, which acts through the openings 28 and holds the valve-seating surface 50 against the valve-seat 23. When the flow of the water nearly ceases as the elevator is stopped by the usual means, the valve drops by its weight into its open position.

The shock which might be due to sudden closing of the valve is prevented by the air-chamber 65, into which the water flows, compressing the air and gradually stopping the flow in the main pipe. Should the velocity be such that the limit of compression in the air-chamber to reduce the shock is reached, the relief-valve 70 would open, allowing the water to discharge through the waste-pipe 71.

My invention may be applied to other hydraulic mechanism than elevators, and changes may be made in it without departing from its spirit and main features which I have stated above and which I have attempted to cover in the following claims.

I claim—

1. In a valve the combination with the casing, of a valve-seat, a movable valve having adjustable surfaces located in the path of the flow, whereby said valve may be closed when the flow reaches a certain velocity by the resistance of said surfaces to said flow.

2. In a valve, the combination with the casing, of the valve-seat, a slidable valve, adjustable wing-plates on said valve located to present resisting-surfaces to the flow of water through said casing and adapted to be adjusted to present more or less surface thereto whereby said valve may be seated when the flow reaches a certain velocity.

3. In a valve, the combination with the casing, of the valve-seat, a movable valve adapted to be seated when the velocity of flow attains a certain rate, and means for holding said valve to said seat until after the velocity of flow is reduced nearly to zero.

4. The combination with a valve, means adapted to close said valve when the velocity of flow exceeds a certain rate, and vacuum means, whereby the flow of fluid through the valve creates a vacuum for holding said valve in its closed position.

5. In a valve, the combination with the casing, of the valve-seat, a movable valve adapted to be automatically seated when the velocity of flow attains a certain rate, a vacuum-chamber, apertures through said valve-seat communicating with said vacuum-chamber and adapted to be covered by the valve when seated.

6. In a valve, the combination with the casing, of the valve-seat, a movable valve adapted to be automatically seated when the velocity of flow attains a certain rate, a vacuum-chamber having opening into the main water-passage, apertures through said valve-seat communicating with said vacuum-chamber and adapted to be covered by said valve when seated.

7. In a valve, the combination with the casing, of the valve-seat, a movable valve adapted to be automatically seated by the flow of water through the casing, a vacuum-chamber formed behind said valve-seat and between the casing and the main water-passage, and having openings from said main water-passage into said chamber, and openings through said valve-seat, the latter being adapted to be covered by said valve when seated, whereby when said valve is seated the flow of the water through the main water-passage will create a vacuum in said vacuum-chamber, holding said valve to its seat until a greatly-reduced flow is established.

8. In a valve the combination with the casing, of the valve-seat, a movable valve adapted to be automatically seated by the flow of water through the casing, and adjustable means for regulating the flow of water through the valve when it is seated, substantially as described.

9. In a valve the combination with the casing, of the valve-seat, a movable valve having adjustable wing-plates adapted to be automatically seated by the flow of water through the casing, means for holding said valve to its seat after the reduced flow is established and means for regulating the reduced flow, substantially as described.

Signed by me at Worcester, Massachusetts, this 25th day of January, 1901.

GEORGE I. ALDEN.

Witnesses:
W. A. REED,
F. H. LINCOLN.